United States Patent [19]

Masuda et al.

[11] 3,900,813

[45] Aug. 19, 1975

[54] GALVANO-MAGNETO EFFECT DEVICE

[75] Inventors: Noboru Masuda, Kawaguchi; Hisashi Takiguchi, Tokyo, both of Japan

[73] Assignee: Denki Onkyo Company, Ltd., Tokyo, Japan

[22] Filed: Jan. 11, 1974

[21] Appl. No.: 432,834

Related U.S. Application Data

[63] Continuation of Ser. No. 183,007, Sept. 23, 1971, abandoned.

[30] Foreign Application Priority Data

Sept. 28, 1970 Japan .............................. 45-84799

[52] U.S. Cl. .......... 338/32 R; 323/94 H; 338/32 H; 338/329; 357/70

[51] Int. Cl. .......................................... H01c 7/16

[58] Field of Search ............... 338/32 R, 32 H, 329; 323/94 H; 324/45; 29/576 S, 589; 357/70

[56] References Cited

UNITED STATES PATENTS

| | | | |
|---|---|---|---|
| 2,019,457 | 10/1935 | Lodge | 338/329 X |
| 2,855,549 | 10/1958 | Kuhrt et al. | 324/45 |
| 3,315,205 | 4/1967 | Kuhnlein et al. | 338/32 H |
| 3,374,537 | 3/1968 | Doelp, Jr. | 29/576 S X |
| 3,544,857 | 12/1970 | Byrne et al. | 29/576 S X |

*Primary Examiner*—C. L. Albritton
*Attorney, Agent, or Firm*—Armstrong, Nikaido & Wegner

[57] ABSTRACT

A galvano-magneto effect device comprised of a semiconductor element and lead frames, the element being provided with electrodes which are coated with a thermally fusible conductive material and are formed at the terminal sections of the element and the conductive lead frames being made by reducing the thickness of the end portions which are to be coupled to the electrodes and coating them with a thermally fusible conductive material.

5 Claims, 8 Drawing Figures

GALVANO-MAGNETO EFFECT DEVICE

This is a continuation of application Ser. No. 183,007, filed Sept. 23,1971, and now abandoned.

BACKGROUND OF THE INVENTION

The present invention relates to a galvano-magneto effect device (hereinafter referred to as the "device") and the use of such an element as a magneto resistance effect element or a Hall effect element.

The conventional device of this type has been disadvantageous, as described below, because lead wires are directly soldered to the electrode sections.

Since the wires are pressed and bonded onto the electrode sections by using the bonding tip, the electrode sections are occasionally damaged. Further, the welding area is small because the sectional shape of a wire is round and therefore the strength of a welded portion is insufficient.

It is very difficult to separately solder lead wires because the device is extremely small.

The present invention provides a galvano-magneto effect device which can eliminate disadvantages described above.

SUMMARY

The present invention provides a galvano-magneto effect device, wherein the semiconductor element such as a magneto-resistance effect element or Hall effect element is coupled to the lead frames by jointing the electrodes provided at the terminal sections of the semiconductor element and the coupling ends of the lead frames, and heating the external surfaces of the coupling ends with a heating means such as the bonding tip; the electrodes of the semiconductor element being coated with a thermally fusible conductive material such as, for example, In, which is melted at the temperature where the semiconductor material of the element is not damaged. The lead frames are provided with coupling ends which are thinned in thickness and are to be coupled to said electrode and which are coated with a thermally fusible conductive material such as, for example, In or Pb which can be melted to join with the conductive material forming said electrodes and can be melted at a temperature where the element is not damaged. The frame is fixed by heating the external surface of the coupling end with a heating means such as the bonding tip.

Also the present invention provides a method for fixing the lead frame if the magneto-resistance effect device is used as the semiconductor element.

This method is comprised of (a) a process to arrange in parallel two frame plates, which are made in the form of comb-type serration by jointing the coupling ends of a number of lead frames to the base plate thereon, so that the coupling ends of the lead frames are opposed to each other, (b) a process to arrange in parallel, magneto-resistance effect elements so that the both-end electrodes are overlapped with corresponding coupling ends between a pair of frame plates before or after said process and (c) a process to heat the coupling ends of the lead frames at the same time, or one by one, and to solder the coupling ends to the electrodes, whereby the lead frames can be attached to a number of semiconductor elements in a short period of time.

BRIEF DESCRIPTION OF THE DRAWINGS

The present invention is illustrated in detail in the accompanying drawings whereof.

DETAILED DESCRIPTION

Figures 1, 2A, 2B, 3:
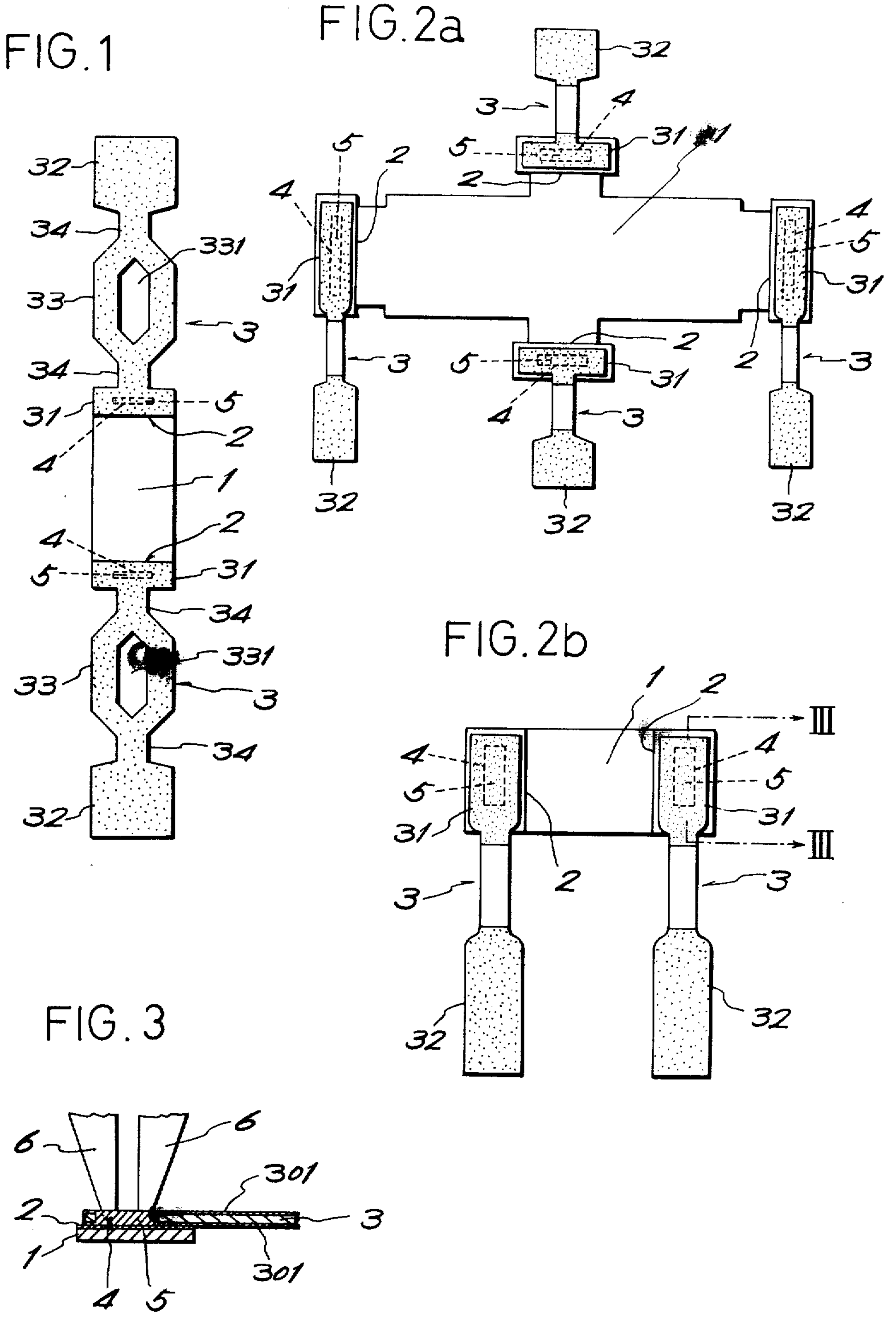
FIG. 1 is a plan view of the device according to the invention.
FIG. 2a and 2b are plan views respectively illustrating other embodiments of the device according to the invention.
FIG. 3 is a cross sectional view of the electrodes of the device along the broken line III—III in FIG. 2b, according to the invention illustrating a means for soldering lead frames to the electrodes of a semiconductor element.

Referring to FIG. 1, there is shown a device according to the present invention which is comprised of magneto-resistance effect element 1 provided with electrodes 2 which are coated with a thermally fusible conductive material by means of a metalizing method, and conductive lead frames 3 attached to said electrodes 2 respectively.

Lead frames 3 are entirely coated with solder plating layer 301. One end of each lead frame is formed as coupling end 31 which is to be jointed to electrode 2 and the other end as connection terminal 32 which is to be connected to the circuit.

The entire lead frame or its coupling end are made thin and through hole 4 is provided at the center of the coupling end. This through hole is filled up with bonding agent 5 such as solder which is thermally fusible to join with the conductive materials of the electrodes and of the coupling ends of the lead frames.

Wide reinforcing part 33 is interpositioned between coupling end 31 and connection terminal 32 of lead frame 3. The reinforcing part, coupling end 31 and connection terminal 32 are interrelated through neck portions 34.

The central portion of said reinforcing part is cut off to reduce the weight of this part and to raise radiation efficiency, and thus slot 331 is formed.

The magneto-resistance effect element can be the Hall effect element as shown in FIG. 2a, and In or Pb in addition to solder can be used as a conductive material which is to be coated on the lead frame. It is desirable that the melting point of a conductive material of the lead frame be slightly lower than that of the conductive material of the electrode.

Usually In is used as the conductive material for forming the electrode. According to experiments, it is known that simultaneous metalization using In (90%) and AG (10%) is effective to raise conductivity and bonding effect.

The lead frames can be arranged in series as shown in FIG. 1 and also in parallel as shown in FIG. 2*b*. Furthermore, the reinforcing part can be omitted as shown in FIG. 2*b*.

The bonding tip is generally used as the heating means to weld the coupling ends of the lead frame to the electrode of the element.

The device provides the advantages as shown below because this embodiment is as described above.

As the thin plate type coupling end of the lead frame contacts the electrode, the coupling end of the lead frame and the electrode can be heated without a strong pressing force and the coupling end of the lead frame does not damage the electrode of the element.

Because the conductive material used to coat the electrode and the coupling end is melted to bond the former and the latter, bonding is powerfully effective.

Connection terminal 32 of the lead frame can be directly soldered to the terminal of the printed circuit board and breakage of wires can be effectively prevented because the strength of the lead frame is larger than that of the lead wire.

As set forth above, it is desirable to coat in advance the connection terminal of the lead frame with a thermally fusible conductive material.

If the lead frame is provided with neck portion 34 as shown in FIG. 1, conduction of heat at the coupling end of the lead frame when welded can be prevented by the neck portion and accordingly, the conductive material used to coat connection terminal 32 with heat, upon welding, can be prevented from melting.

As shown in the embodiment, if through hole 4 is provided at the coupling end of the frame and is filled up with fusible material 5, the fusible material is melted together with the conductive material of the electrode when bonded, and the bonding strength of the coupling and of the lead frame and the electrode can be intensified. The internal surface of through hole 4 serves as the bonding surface, thus enlarging the area of the bonding surface. Furthermore, fusible material 5 is directly heated and therefore melting of materials is effective.

Fusible material 5 in the through hole is heated by bonding tip 6 as shown in FIG. 3 and melted to enter between the electrode and the coupling end of the lead frame. At the initial stage of heating, a small space is formed at the upper opening side of the through hole. Even though the conductive material used to coat the coupling end of the lead frame is melted, the molten material is absorbed into the through hole; accordingly, the conductive material can be prevented from remaining as a boss over the surface of the lead frame.

Figure 4:
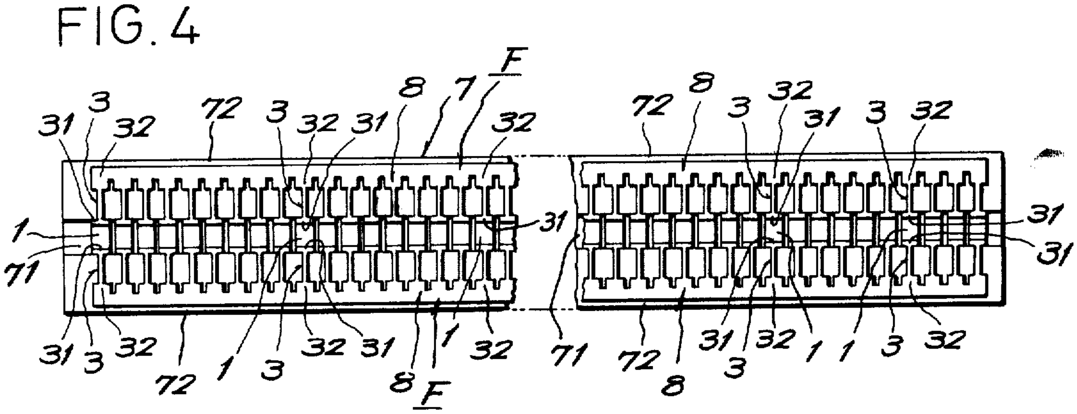
FIG. 4 is a isometric view illustrating an embodiment of the method to fix the lead frames of the device according to the invention.
Figure 5:
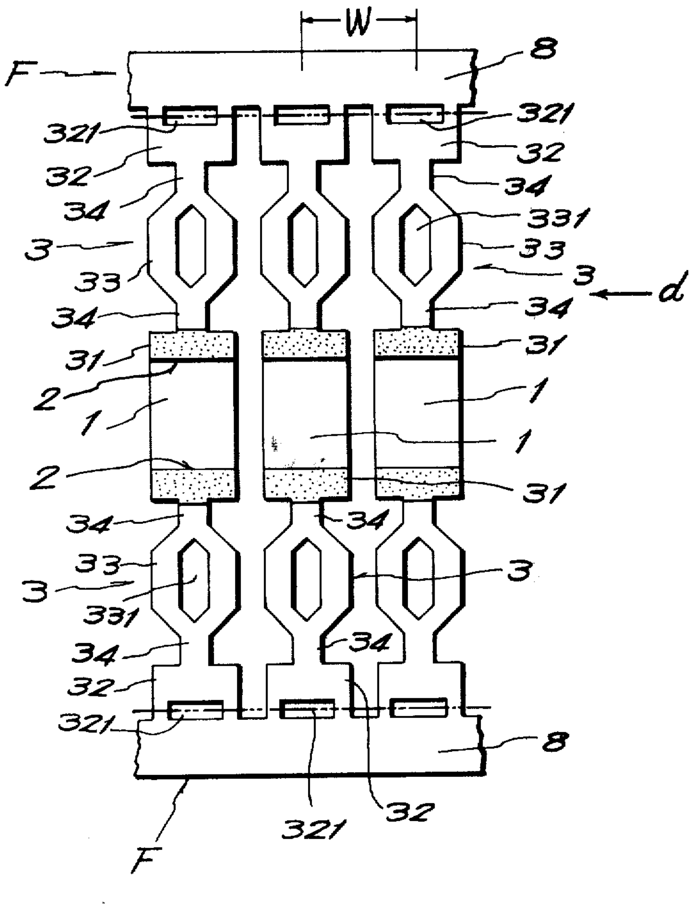
FIG. 5 is a magnified plan view of a principal section shown in FIG. 4.

FIGS. 4 and 5 show the method for fixing the lead frame to the magneto-resistance effect element.

Many elements 1 are mounted in parallel on jig 7.

The jig is provided with groove 71 at the center which is formed to accommodate element 1. Bases 72 are arranged to oppose each other at both sides of groove 71.

After elements 1 are arranged in groove 71, conductive frame plates F are mounted in the bases, respectively.

This frame plate F is provided with a number of lead frames 3 which are arranged in parallel while connection terminals 32 are jointed to base plate 8 of frame plate F. Lead frames 3 are projected with the intervals equal to the intervals of arranged elements 1.

Accordingly, when frame plates F are mounted on the jig, the free coupling ends of lead frames 3 are respectively overlapped on electrodes 2 of elements 1 as shown in FIG. 5.

It is desirable to make frame plates F by means of an etching method but, depending on the case, frame plates F can be made in any other method.

When coupling ends 31 of said lead frames 3 are heated from outside, coupling ends 31 of the lead frames and the electrodes are jointed due to melting as described in the foregoing.

If the bonding tip is used as the heating means, it is advantageous because the lead frames are automatically bonded with a number of the elements in sequence by moving the bonding chip in direction *d* across the lead frames in FIG. 5 and shifting it in accordance with intervals W among the lead frames.

As described above, when the coupling ends of the lead frames are bonded to the electrodes at both sides of all elements, connection terminals 32 of the lead frames are separated from base plate 8 to obtain the unit devices.

It is desirable to provide slots 321 at connection terminals 32 of the lead frames to facilitate separation of connection terminals 32 from base plate 8.

Figure 7:
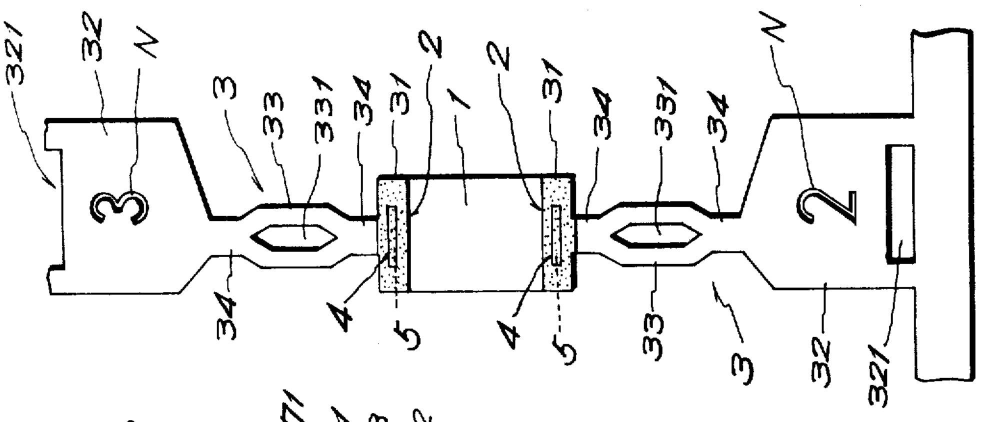
FIG. 7 is a magnified plan view of part of FIG. 6, showing the condition of the device according to the invention when measuring the characteristics.
Figure 6:
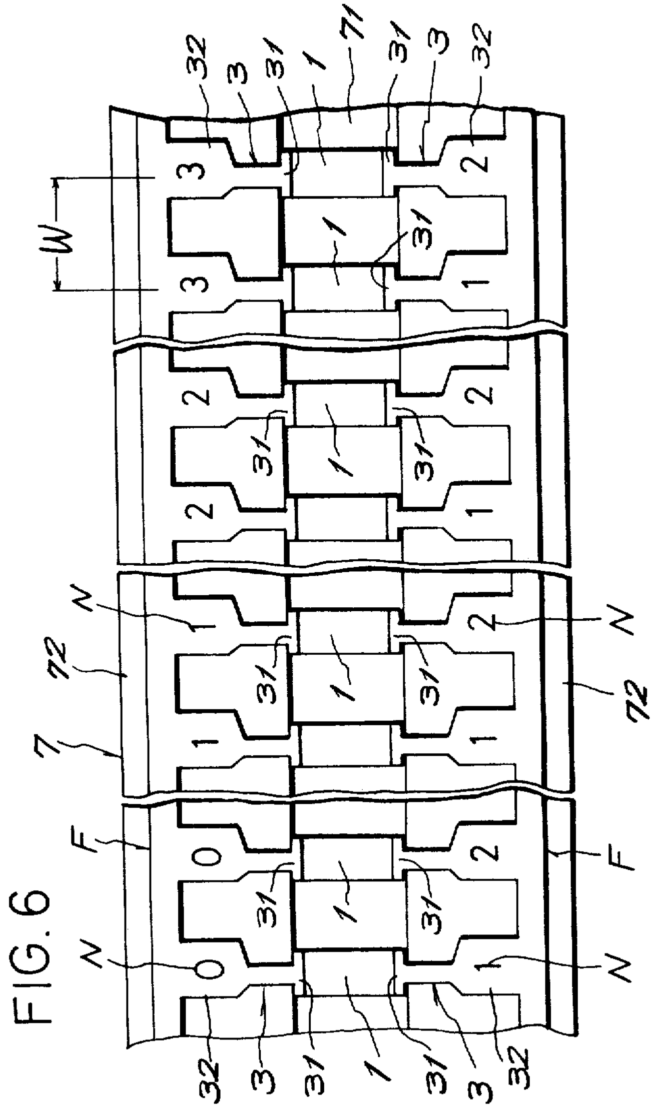
FIG. 6 is a magnified plan view of a principal section illustrating the other embodiment of a method for fixing the lead frames of the device according to the invention.

FIGS. 6 and 7 show the embodiment permitting inscribing the numbers on the lead frames.

Connection terminals 32 of lead frames 3 are made to have a wide area and symbol N such as the numerals are entered thereon by an etching process.

The symbol entering means is determined as desired. Since the symbol is indicated with the through hole when the etching process is employed, the symbol will not be erased, heat radiation when soldering the connection terminals of the lead frames can be improved and the lead frames can be reduced in weight by enlarging the symbol.

The symbols to be entered in the lead frames can be of the kind which indicates the lot numbers and characteristics of the element. It is desirable to enter the numerals respectively in two frames connected to both ends of the element as the identification numbers and to record the output characteristic of the elements corresponding to the identification numbers.

The means to inspect the output characteristics of the element is such that the magnetic field is applied to the element while the current is supplied and the variation of voltage at both ends of the element. Accordingly, the output characteristic of each element can be measured under the condition where a number of elements are mounted between a pair of frame plates F; however, the following procedure is actually more convenient for measuring the output characteristic.

The electrodes of the elements are welded with the ends of lead frames 3 of a pair of frame plates F and a number of elements 1 are bonded in parallel arrangement between a pair of frame plates F as shown in FIG. 6.

The identification number is recorded in advance in lead frame 3; for example, in the figure, the high-order digit number is recorded in connection terminal 32 of the upper lead frame and the low-order digit number in connection terminal 32 of the lower lead frame in FIG. 6.

Accordingly, the high-order digit number of identification numbers 1 to 9 is indicated as 0 and that of identification numbers 10 to 19 is indicated as 1.

After all lead frames 3 have been provided respectively with each element 1, lead frames 3 of one of a pair of frame plates F are separated from base plate 8 and connection terminals 32 of the lead frames are made as a free end.

Base plate 8, from which lead frames 3 are not separated, is connected to one electrode of the power supply so that base plate 8 may be used as a common circuit and the other electrode of the power supply is connected in sequence to the free ends of the separated lead frames. Then, the magnetic field is applied to the free ends while the current is supplied to the elements, thus examining the output characteristic of the elements in sequence.

The results of this examination are recorded corresponding to the identification numbers inscribed on the connection terminals of the lead frames and are kept for future reference.

The lead frame mounting method described above is advantageous as shown below.

Economical mass production of the devices is possible because the lead frames can be attached to a number of elements in a short period of time.

Because base plate 8 provided with a number of lead frames arranged in the form of comb-type serration can be kept as is, storage and maintenance of the elements are extremely easy, and because the devices with the required output characteristic can be immediately selected according to the identification number and other symbols of the device, the desired devices can be easily taken out.

What is claimed is:

1. A galvano-magneto effect device comprised of:

a. a semiconductor element having terminal sections wherein electrodes are formed and coated with a thermally fusible conductive material at said terminal sections, and b. a plurality of conductive lead frames each comprising two wide ends, one end formed as the coupling end connected to one of said electrodes, the other end formed as a connection terminal to be connected to a circuit, a wide reinforcing part and narrow neck portions coupling said reinforcing part between said coupling end and said connection terminal, wherein at least said coupling end is formed thinly and has a prior coating of a thermally fusible conductive material which is melted to join with the conductive material forming the electrodes of said semiconductor element, wherein when the lead frames and semiconductor elements are brought together and the conductive material of the coupling ends and that of the electrodes are bonded, the lead frames are thereby bonded to the electrodes.

2. A galvano-magneto effect device according to claim 1, wherein a slot is provided at the reinforcing part of said lead frame 3. A galvano-magneto effect device according to claim 1, wherein said connection terminal is provided with a wide area and a symbol is inscribed thereon.

4. A galvano-magneto effect device according to claim 1, wherein the coupling end of the lead frame is provided with a through hole having a thermally fusible conductive material therein, wherein said conductive material bonds said electrode and with the conductive material of the coupling end upon the application of heat thereto.

5. A galvano-magneto effect device according to claim 1 wherein said connection terminal includes a through hole formed therethrough said through hole forming a symbol.

* * * * *